(12) United States Patent
Marczynski

(10) Patent No.: US 8,152,426 B2
(45) Date of Patent: Apr. 10, 2012

(54) ROTATION INDICATOR DEVICE

(75) Inventor: Michael Marczynski, Kirkby Lonsdale (GB)

(73) Assignee: Business Lines Limited, Kirkby Lonsdale, Cumbria (GB)

(*) Notice: Subject to any disclaimer, the term of this patent is extended or adjusted under 35 U.S.C. 154(b) by 150 days.

(21) Appl. No.: 12/733,326

(22) PCT Filed: Aug. 21, 2008

(86) PCT No.: PCT/GB2008/050732
§ 371 (c)(1),
(2), (4) Date: Feb. 24, 2010

(87) PCT Pub. No.: WO2009/027731
PCT Pub. Date: Mar. 5, 2009

(65) Prior Publication Data
US 2010/0206214 A1 Aug. 19, 2010

(30) Foreign Application Priority Data
Aug. 25, 2007 (GB) .................. 0716641.6

(51) Int. Cl.
*F16B 31/02* (2006.01)
(52) U.S. Cl. .................. 411/14; 411/431; 411/121
(58) Field of Classification Search .......... 411/14, 411/431, 377, 121, 512, 372.6
See application file for complete search history.

(56) References Cited

U.S. PATENT DOCUMENTS

| | | | | |
|---|---|---|---|---|
| 4,050,494 A * | 9/1977 | de Claire | ...... | 411/119 |
| 4,784,555 A * | 11/1988 | Cantrell | ...... | 411/431 |
| 4,930,951 A * | 6/1990 | Gilliam | ...... | 411/14 |
| 5,120,174 A * | 6/1992 | Patti | ...... | 411/431 |
| 5,129,770 A * | 7/1992 | Coleman | ...... | 411/373 |
| 5,642,973 A * | 7/1997 | Pretty | ...... | 411/431 |
| 6,036,420 A * | 3/2000 | Somers et al. | ...... | 411/430 |
| 6,270,302 B1 * | 8/2001 | Lyons | ...... | 411/8 |
| 6,672,547 B1 * | 1/2004 | Westerberg et al. | ...... | 248/74.1 |
| D604,155 S | 11/2009 | Marczynski | | |
| D610,442 S | 2/2010 | Marczynski | | |

FOREIGN PATENT DOCUMENTS
GB 2 242 720 10/1991
GB 2 335 720 9/1999

* cited by examiner

*Primary Examiner* — Flemming Saether
(74) *Attorney, Agent, or Firm* — Dennison, Schultz & MacDonald

(57) ABSTRACT

A rotation indicator device comprises a body having a bore, whereby the body is adapted to be releasably mounted on a polygonal fastener or other multi-angled component in any selected position. At least part of the body which defines the bore is formed of a resilient material of suitable grip and flexibility characteristics, such as silicone rubber material, and the bore has an edge margin which is of a tapered profile in cross-section so that the body can be snugly mounted onto the fastener or other component without any relative rotation occurring between the device and the fastener or other component.

3 Claims, 5 Drawing Sheets

ROTATION INDICATOR DEVICE

This application is a 371 of PCT/GB2008/050732, filed on Aug. 21, 2008.

FIELD OF INVENTION

The present invention relates to any rotation indicator device which comprises a body having a bore whereby the body is adapted to be releasably mounted onto a polygonal fastener, such as a nut or a head of a bolt.

BACKGROUND ART

Various devices of this type in which the bore in the body is formed with a plurality of grooves so that the body can be mounted onto the fastener in any selected one of a plurality of positions are described in earlier patent specifications GB 2242720 A, GB 2325502 A, GB 2335720 A and GB 2409251 A. In GB 2242720 A a safety device is disclosed comprising a simple annular body, the bore of which has plural grooves as aforesaid, which body has a projecting pointer so that when the body is fitted over a hexagonal wheel nut any rotation of the nut, i.e., any loosening of same, will be indicated by movement of the pointer away from a particular initial position which may be towards a marker or towards an adjacent device on an adjacent wheel nut. GB 2335720 A and GB 2325502 A disclose a development wherein a dust cap is incorporated into such a device either integrally or as a separable component. Such devices are now widely used on heavy goods vehicles as a safety measure to indicate any loosening of their wheel nuts. Similar devices are also used as component parts of an assembly comprising multiple such rotation indicators and a ring-like holder for same, as described in GB 2393487 A and GB 2409251 A.

Wheel nuts may be of different sizes, the two most common for HGV being 32 mm and 33 mm across the flats. Accordingly, devices of the types just mentioned, which are commercially available under the registered trade marks "Checkpoint" and "Dustite", are produced in at least two sizes for snug fitting to at least these sizes of wheel nut so that the angles of the respective hexagonal nuts fit closely into relevant grooves in the bore of the device. Wheel nuts of 31 mm and 34 mm are also known, and further "Checkpoint" devices of suitable bore size and groove size/spacing are, although less common, produced to fit these for indicator purposes.

SUMMARY OF THE INVENTION

The present invention provides a rotation indicator device comprising a body having a bore whereby the body is adapted to be releasably mounted onto a polygonal fastener or other multi-angled component in any selected position, characterised in that at least part of the body which defines the bore is formed of a resilient material of suitable grip and flexibility characteristics and the bore has an edge margin which is of a tapered profile in cross-section so that the body can be snugly mounted onto the fastener or other component without any relative rotation occurring between the device and the fastener or other component.

Such a device is easier to fit than the known devices mentioned above as there is no requirement to bring plural grooves and teeth into register. Such a device is also easy to manufacture, without requirement for extreme precision as with the previous devices having plural grooves and teeth. Such a device is also relatively inexpensive to manufacture.

The resilient material used should also, preferably, have characteristics of high temperature resistance, maintain its grip and flexibility and have good deformability/resilience characteristics over a wide temperature range, have high resistance to oil and be impervious to water.

A suitable resilient material for the purpose is a silicone rubber. A practically useful embodiment of the device of the invention may be formed from a silicone rubber selected from the range marketed under the trade name "Silastic" by Dow Corning. A specific example which is suitable is Silastic® EHX80MHROO. However, it would be obvious to a skilled man that other silicone rubbers, other synthetic rubbers, such as a butyl rubber or a nitryl rubber, and, indeed other resilient materials with suitable characteristics could be selected from the many which are commercially available.

The invention has potential for wide application in respect of any devices for fitting onto hexagonal nuts or bolt heads, and also in respect of devices for fitting onto different shaped nuts and bolt heads, eg, square or octagonal or other shaped nuts or bolt heads.

The invention may also be applied to component parts of assemblies for rotation indication purposes, for example component parts which fit over other parts having a polygonal or multi-angular peripheral surface.

An added benefit of devices in accordance with the invention is that the body is likely to be able to be snugly mounted onto polygonal fasteners or other multi-angular components of a range of shapes or sizes with similar effect. When this is the case and a single device is able to fit at least two different sizes of nut (or bolt head) or other component as aforesaid, a saving in manufacturing costs can be achieved by use of only a single mould, or at least only a single mould core, instead of two separate moulds or mould cores hitherto.

BRIEF DESCRIPTION OF DRAWINGS

The invention will be described further, by way of example, by reference to the accompanying drawings, in which.

DETAILED DESCRIPTION OF ILLUSTRATED EMBODIMENTS

Figure 1:
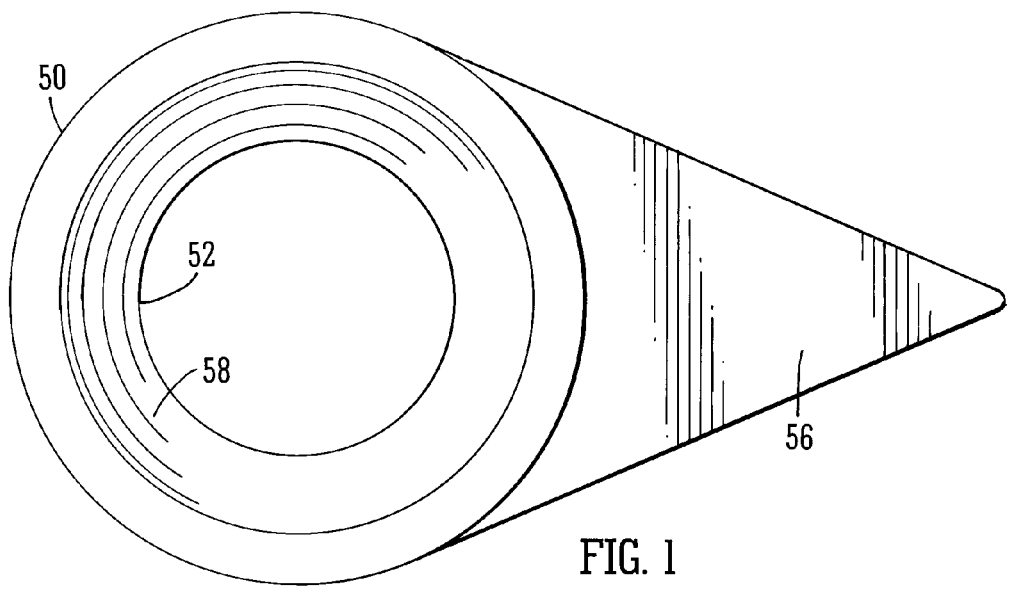
FIG. 1 is a plan view of a device in accordance with the invention.
Figure 2:
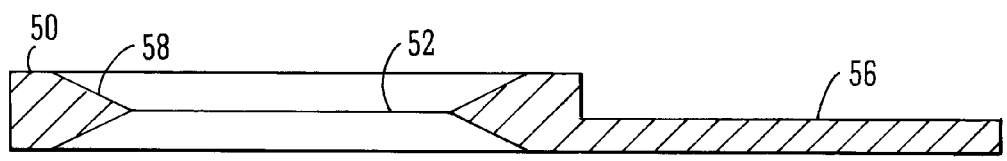
FIG. 2 is a cross-section of the device shown in FIG. 1.
Figure 3:
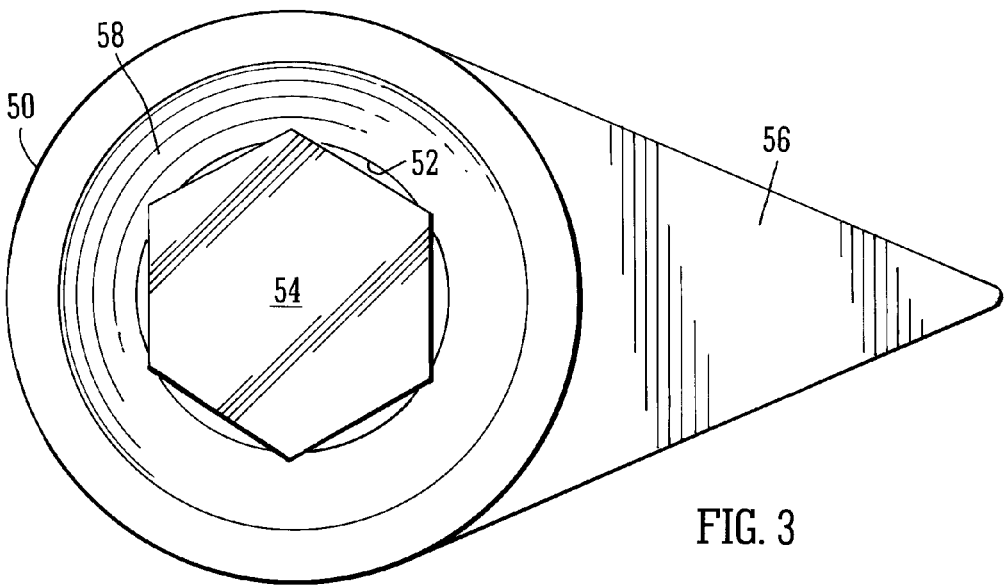
FIG. 3 is similar to FIG. 1 but shows the same device mounted onto a hexagonal nut of 32 mm or 33 mm diameter.

The principle is illustrated in FIGS. 1 to 3. A body, which for purposes of illustration is a simple circular body 50 having a triangular pointer 56 extending radially outwards, is moulded from a suitable silicone rubber material. The body 50 has a bore 52 formed through its centre whereby the body 50 can be releasably mounted in any angular orientation onto a hexagonal nut 54, as shown in FIG. 3. This is possible because an inner edge margin 58 defining the bore 52 has a tapering profile with upper and lower linear sloping surfaces sloping in opposite directions relative to a plane normal to the axis of the bore 52 to a free peripheral edge, as shown in FIG. 2. It is therefore sufficiently flexible and deformable to fit over a hexagonal shape of chosen matching dimensions and, in this case, permit a snug fit over a 32 mm size hexagonal nut 54, as in FIG. 3, the size being measured across the flats, as is customary.

Once so fitted the grip of the device onto the nut 54 is sufficient to prevent any relative rotation of the body 50 on the nut 54, either clockwise or anticlockwise. The position of the pointer 56 therefore remains in the direction selected by the user when fitting the device and will only move along with the nut 54 if it loosens. The device therefore serves as a rotation indicator to indicate loosening of a nut, as explained below in relation to the known devices shown in FIGS. 4 to 6.

Upon removal of the device from the nut 54 the resilience of the material in the edge margin 58 of the bore 52 is such that it returns substantially to its original configuration. Moreover, by careful choice of the original dimensions of the bore 52 and its tapered edge margin 58, the same device can also be fitted in the same way over a nut of a slightly different size, for example over a 33 mm nut.

In fact, by judicious choice of dimensions of the bore edge margin 58 and material, the same device may fit other sizes too, namely 31 mm and 34 mm across the flat size hexagonal nut while maintaining adequate grip when fitted, yet still being removable by lifting axially of the nut or bolt head.

Obviously the body 50 could be fitted over bolt heads of the same dimensions instead of the nut 54.

Although hexagonal nuts or bolt heads would be most common, the bore 52 could be dimensioned to fit onto other polygonal fasteners, even square nuts or bolt heads.

Figure 6:
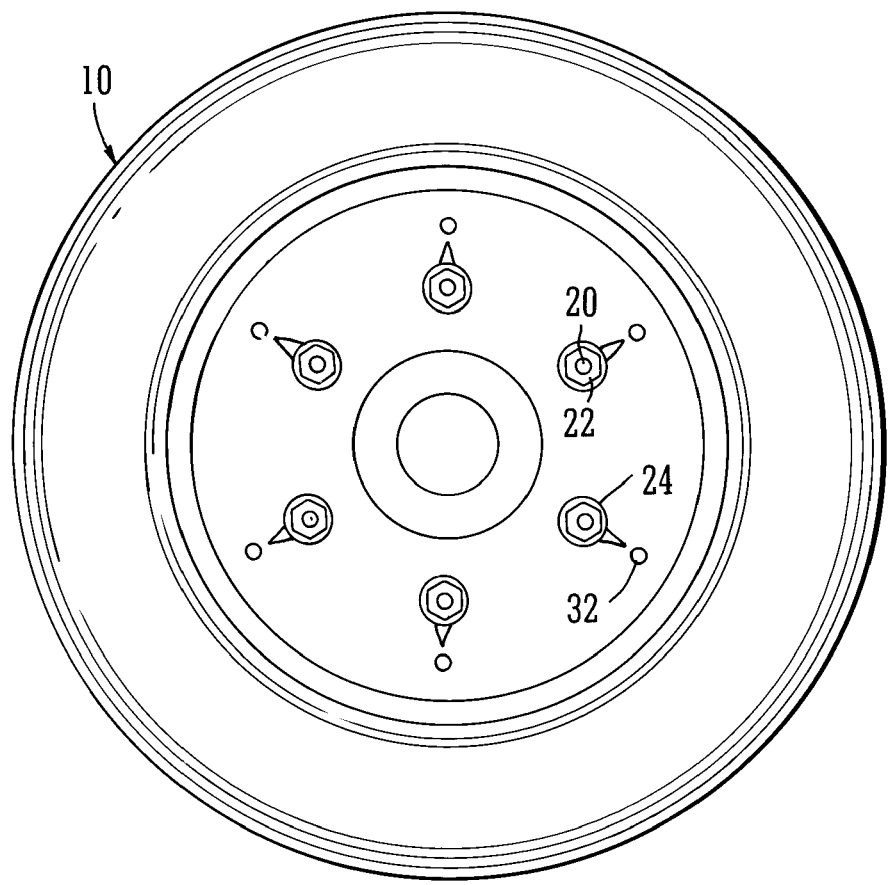
FIG. 6 is a side view of a vehicle wheel onto which the wheel nut indicators as in FIG. 4 or 5 have been mounted.
Figure 4:
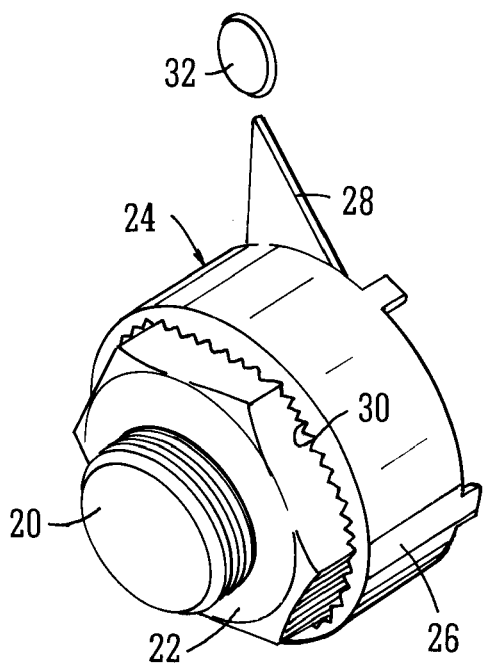
FIG. 4 is a perspective view of a known safety indicator device mounted onto a wheel nut.
Figure 5:
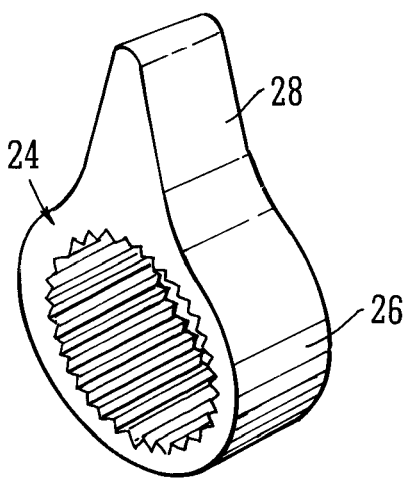
FIG. 5 is a perspective view of a known variant of a safety indicator device.

FIGS. 4 to 6 show a known indicator device 24 comprising an annular body 26 with a projecting pointer 28. The body 26 has its bore provided with plural equally spaced grooves 30 to enable it to be releasably fitted at a plurality of rotational positions onto a wheel nut 22 on an axle stub 20. FIG. 6 shows such indicators 24 mounted onto all the wheel nuts 22 of a wheel 10 with their pointers 28 directed towards respective markers 32.

The invention exemplified in FIGS. 1 to 3 can be applied to the body 26 of such indicators 24 to allow them to be snug fitted to two or more different sizes of wheel nuts, by replacing the grooves 30, which are adapted to one size nut only, by the new material and the tapered bore edge margin.

The invention can be applied to similar devices which do not have projecting pointers, but merely have arrows or other similar marking indicia thereon.

The invention can also be applied to similar devices which instead of pointers have enlarged projecting tabs. Such devices may be fitted over individual wheel nuts to indicate that the relevant wheel nut requires attention, typically re-torquing, but perhaps replacing, during vehicle servicing operations.

Figure 9:
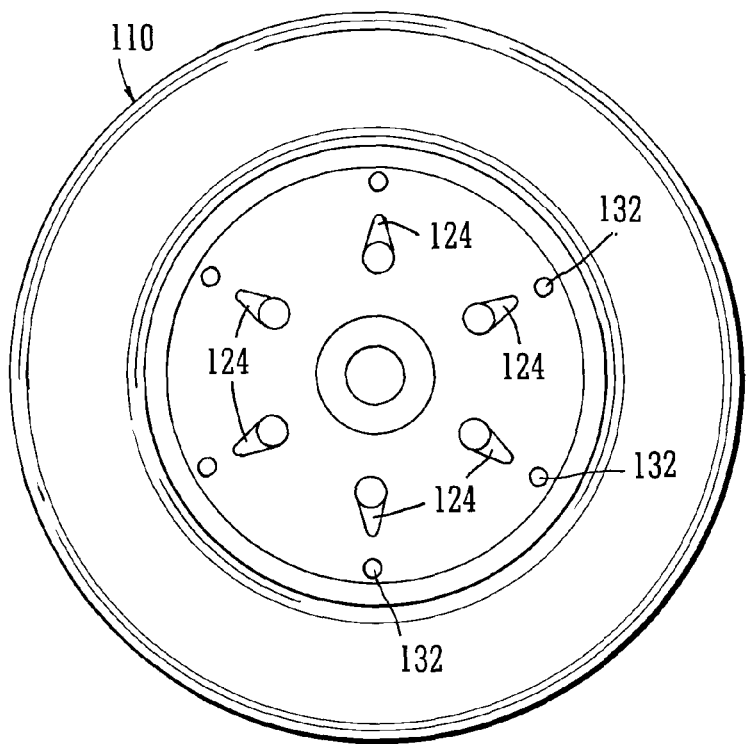
FIG. 9 is a side view of a vehicle wheel onto the wheel nuts of which combined dust cap indicators as in FIGS. 7 and 8 have been mounted.
Figure 8:
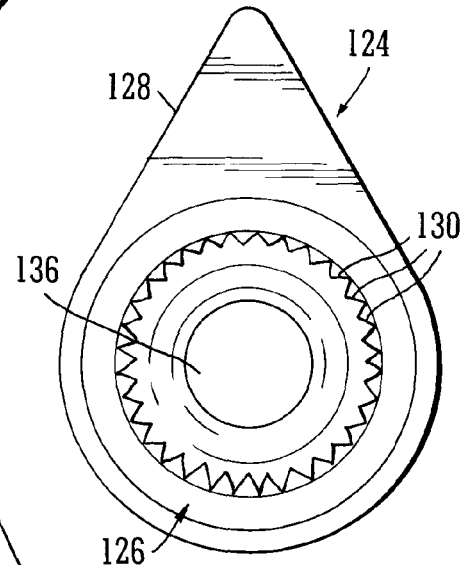
FIG. 8 is an underside view of the combined device shown in FIG. 7.
Figure 7:
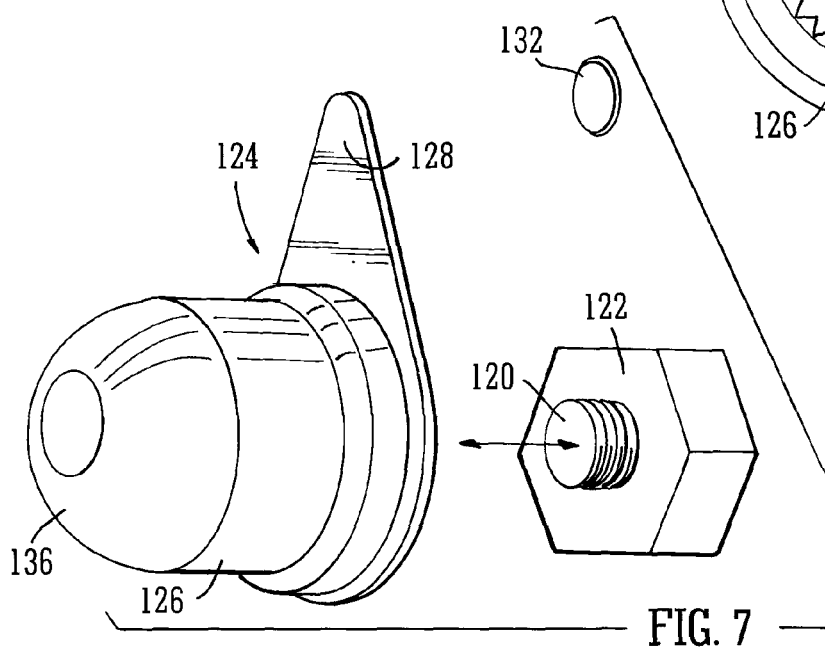
FIG. 7 is a perspective view of a known combined dust cap and safety indicator device showing how it is mounted onto a wheel nut.

FIGS. 7 to 9 similarly show a known combined dust cap and indicator device 124 with a projecting pointer 128. Its body 126 similarly has its bore provided with plural equally spaced grooves 130 to enable it to be releasably fitted at a plurality of rotational positions onto a wheel nut 122 on an axle stub 120. A domed integral cap or cover 136 is provided on the body 126. FIG. 9 shows such indicators 124 mounted onto all the wheel nuts 122 of a wheel 110 with their pointers 128 directed towards respective markers 132.

The invention exemplified in FIGS. 1 to 3 can be applied to the body 126 of such indicators 124 to allow them to be snug fitted to two or more different sizes of wheel nuts again by replacing the grooves 130, which are adapted to one diameter nut only, by the new material and the tapered bore edge margin. The invention can also be applied to similar devices which do not have projecting pointers but merely have arrows or other similar marking indicia thereon.

The invention can also be applied to similar devices which have a separable dust cap component instead of an integral dome 136, such devices being disclosed in the applicant's earlier GB 2325502 A.

Figure 10:
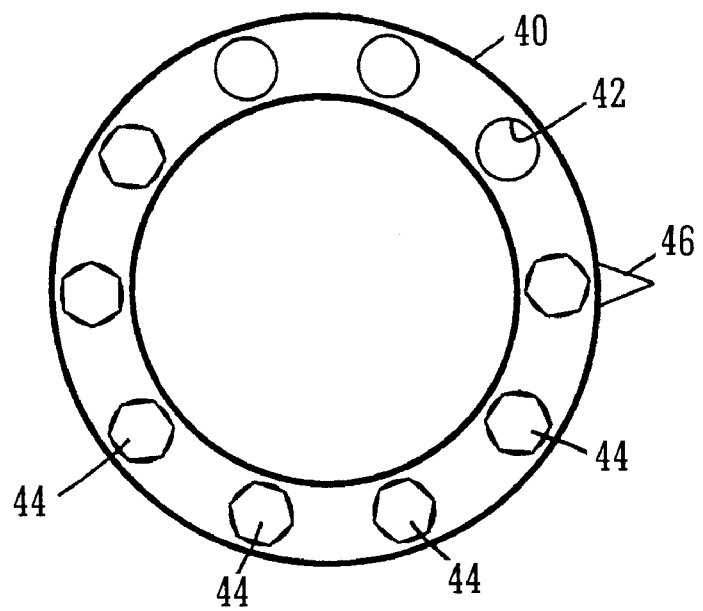
FIG. 10 is a plan view of a known rotation indicating assembly for adjacent nuts or bolts.
Figure 11:
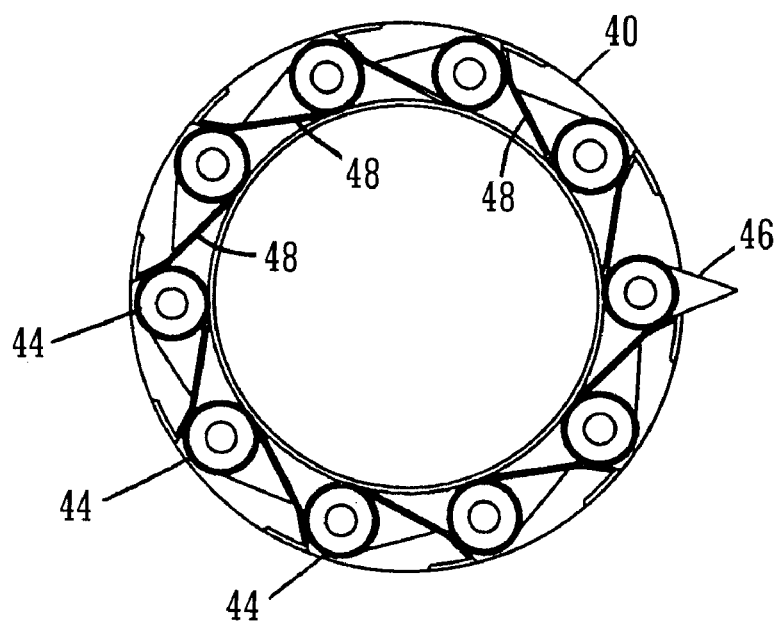
FIG. 11 is an underside view of the assembly shown in FIG. 10.

FIGS. 10 and 11 show a known rotation indicating assembly as disclosed, for example, in GB 2393487. This comprises a ring member 40 having a plurality of apertures 42 in which respective individual indicator devices 44 similar to those described above in relation to FIGS. 7 and 8 are captively and rotatably retained. Thus, each device 44 is annular, having a bore provided internally with a plurality of grooves (not shown) for non rotatable fitting onto a wheel nut, as previously described, and includes an integral cap or cover as well as a projecting pointer 46. The ring member 40 is provided on its underside with a series of flanges 48 for abutment of the respective pointers 46.

In use the respective devices 44 are held in the ring member 40 with their respective pointers 46 at the underside (as shown in FIG. 11) (the side at which the assembly is presented to the face of a vehicle wheel) and their respective caps projecting through the apertures to the other visible side (as shown in FIG. 10). Initially, the devices 44 are rotated to their fully masked condition wherein their respective pointers 44 abut the flanges 48, as shown in FIG. 11 for all but one of the devices. The assembly is then fitted onto a vehicle wheel, the wheel nuts of which have been tightened to the appropriate degree, with a respective device 44 fitting non rotatably onto each wheel nut. Subsequently, if any one of the wheel nuts begins to loosen, the respective device 44 fitted thereto rotates along with the nut so that its pointer projects radially from the ring member 40, as shown in FIGS. 10 and 11 at the right-hand side, thereby indicating to the driver or anyone else who inspects the vehicle wheels that that particular nut requires prompt retorquing.

The invention exemplified in FIGS. 1 to 3 can be applied to the body of each of the indicator devices 44 of the assembly shown in FIGS. 10 and 11 to allow them to be snug fitted to two or more different sizes of wheel nuts again by replacing the grooves of the known devices, which are adapted to one size of nut only, by the new material and the tapered bore edge margin. The invention can also be applied to similar devices which do not have projecting pointers but merely have arrows or other similar marking indicia thereon.

Figure 12:
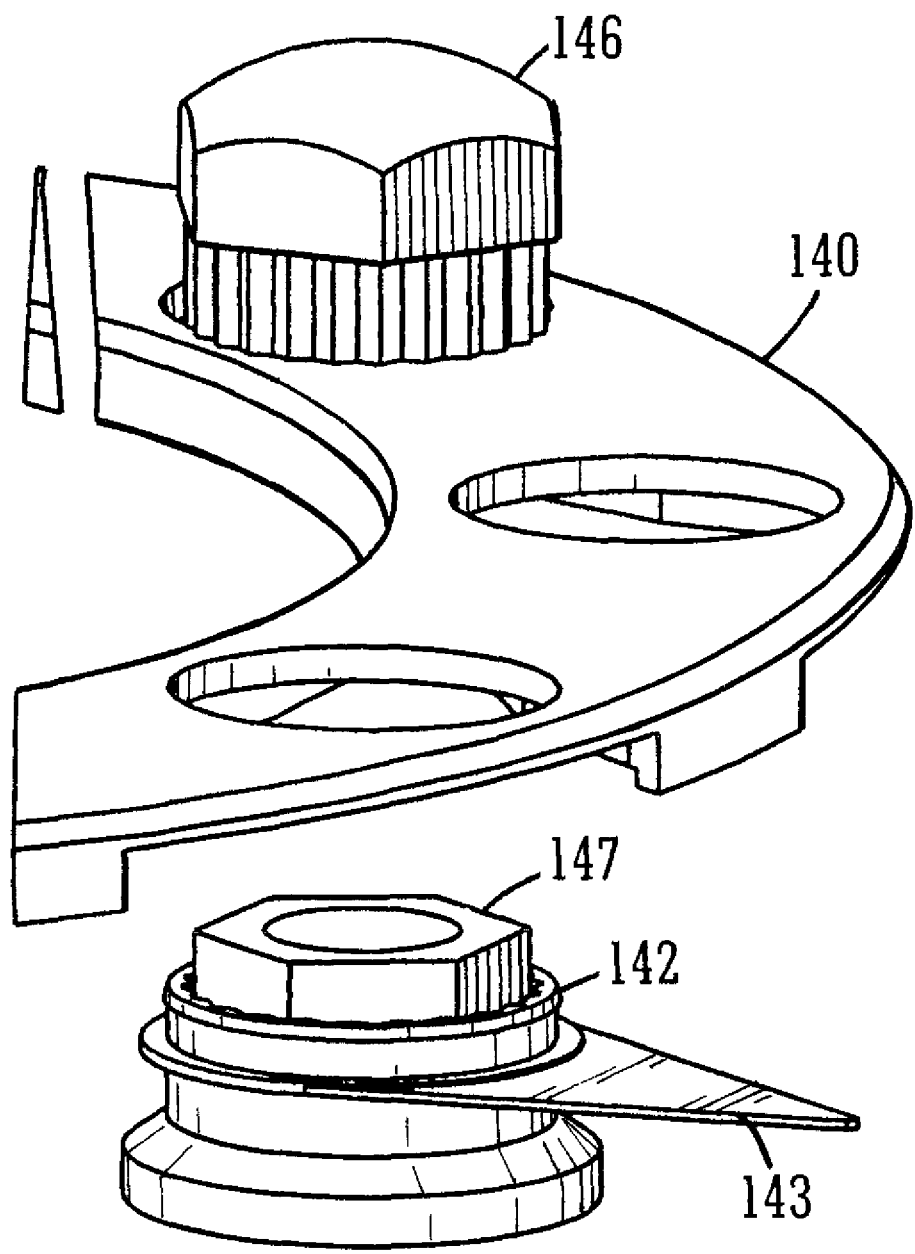
FIG. 12 is a partial perspective view illustrating a different known rotation indicating assembly to which the invention can be applied.

In an alternative form of rotation indicating assembly, as shown in FIG. 12, each of the individual indicator devices 144 mounted in the ring member 140 is formed in two parts, namely an annular part 142 provided with an integral pointer 143 (very similar to the devices shown in FIG. 4) and a separate cap 146. In each case, the cap 146 has a plurality of internal grooves whereby it fits non rotatably onto the respective wheel nut 147 and also a plurality of external grooves whereby it is fitted non rotatably into the annular part 142, which itself has a plurality of corresponding internal grooves/projections. Therefore, the annular parts 142 with the rotation indicating pointers 143 are non-rotatably secured to the respective wheel nuts 147 by way of the intervening cap parts 146. This assembly has the advantage over that shown in FIGS. 10 and 11 in that upon loosening of a single wheel nut it is not necessary to remove and replace the entire assembly. Instead, the individual nut can be re-torqued simply by removal of the respective cap 146 and the respective annular part 142 can be moved back to its fully masked condition below the ring member 140 before final replacement of the respective cap 146 to reconnect the annular part 142 to the nut.

In this case, the invention exemplified in FIGS. 1 to 3 can be applied to the bore of the annular part 142 instead of the relevant grooves, or it can be applied to the interior of the cap 146 instead of its relevant grooves, or it can be applied to both of these situations, again to enable the relevant part to be snug fitted to two or more different sizes of the other internally fitting part or of the wheel nut respectively.

As already mentioned, the invention has potential for wide application and the foregoing is illustrative, not limitative of the scope of the invention. In particular, it should be noted that in other embodiments the taper of the internal edge margin defining the bore need not be symmetrical in the manner shown in FIG. 2, but could be a simple sloping taper or an asymmetrical profile with a slope to a greater angle at one side of the apex compared to the other. Moreover, the apex could be rounded compared to the edge shown in FIG. 2.

The invention claimed is:

1. A rotation indicator device comprising:
a body defining a bore having an axis, said bore being of a size to enable said body to be releasably mounted onto a polygonal fastener or other multi-angled component in any selected position;
wherein said body is formed of a single-piece resilient material having grip and flexibility characteristics; and
wherein said body has an edge margin defining said bore, which edge margin is of a tapered profile in cross-section, said edge margin having a profile with a upper and lower linear sloping surfaces sloping in opposite directions relative to a plane normal to the axis to a free peripheral edge, such that said body can be snugly mounted onto the polygonal fastener or other multi-angled component without any relative rotation occurring between the device and the polygonal fastener or other multi-angled component.

2. A rotation indicator device according to claim 1 wherein the resilient material is a silicone rubber material.

3. A rotation indicator device according to claim 1, wherein the body can be snugly mounted onto a polygonal fastener or other multi-angled component having a range of shapes or sizes.

\* \* \* \* \*